United States Patent

Sissom

[11] 3,804,503
[45] Apr. 16, 1974

[54] PROJECTOR AND INDICATOR COORDINATING APPARATUS

[76] Inventor: John E. Sissom, 6234 Northaven, Dallas, Tex. 75230

[22] Filed: Mar. 15, 1972

[21] Appl. No.: 234,854

[52] U.S. Cl............... 353/15, 353/122, 84/464
[51] Int. Cl. .......................................... G03b 31/06
[58] Field of Search........ 353/28, 15, 122; 340/381; 84/464

[56] References Cited
UNITED STATES PATENTS

| | | | |
|---|---|---|---|
| 3,488,654 | 1/1970 | Cheslock | 340/381 |
| 3,337,845 | 8/1967 | Hart | 340/381 |
| 3,480,738 | 11/1969 | Meyer | 353/15 |
| 3,020,798 | 2/1962 | Chrisman | 353/122 |

FOREIGN PATENTS OR APPLICATIONS

| | | | |
|---|---|---|---|
| 1,260,187 | 2/1968 | Germany | 353/15 |

Primary Examiner—Louis R. Prince
Assistant Examiner—A. Jason Mirabito
Attorney, Agent, or Firm—Howard E. Moore; Gerald G. Crutsinger

[57] ABSTRACT

An automated theater having sound production apparatus, projector apparatus, and a graphic representation having indicator lights thereon in combination with a programmed tape reader apparatus to maintain sound, projection and graphic indication in synchronized relation. The program apparatus is stepped by timing pulses picked up from the sound recording tape and the tape reader controls illumination of indicator lights and a plurality of slide projectors.

9 Claims, 2 Drawing Figures

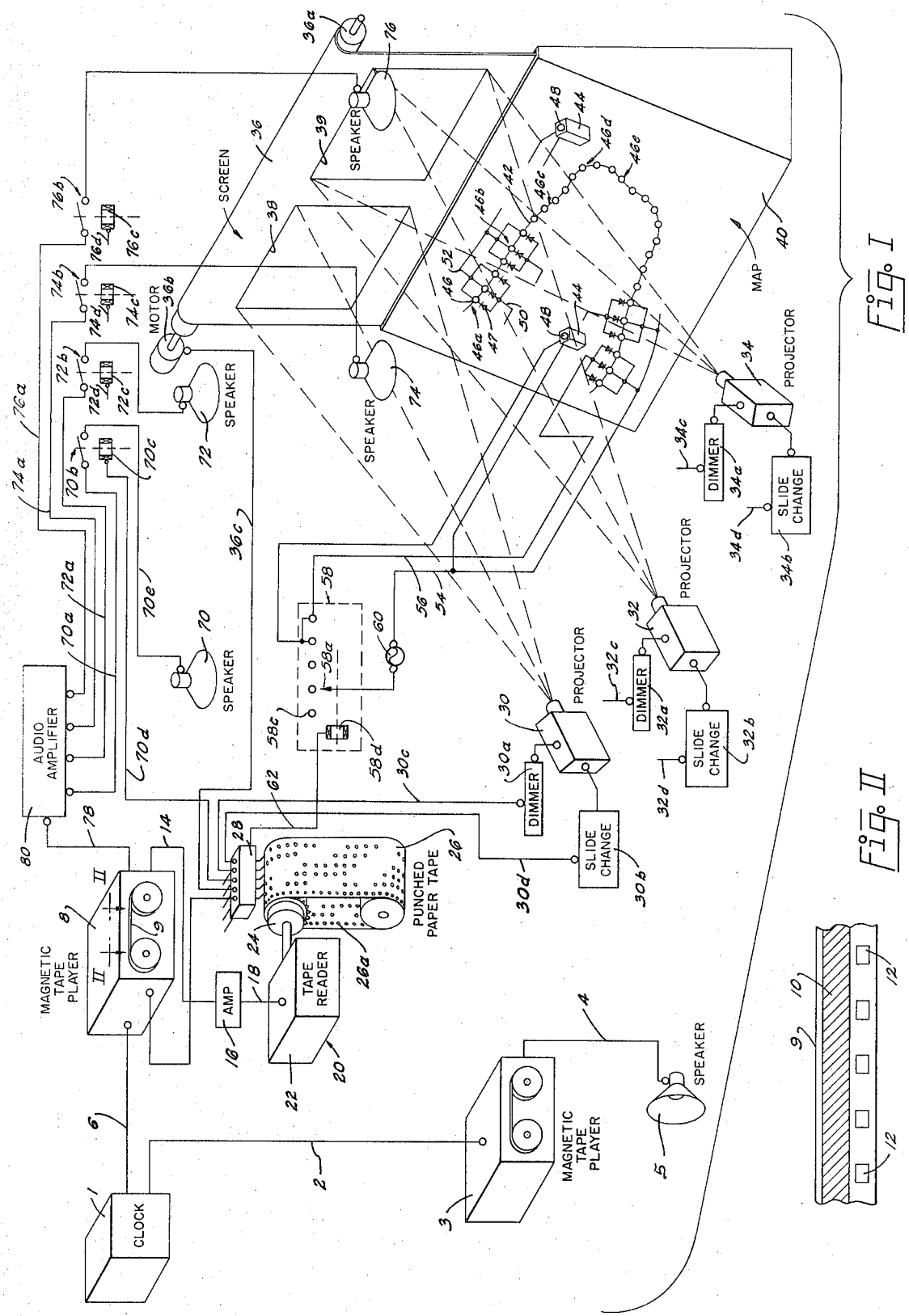

PROJECTOR AND INDICATOR COORDINATING APPARATUS

BACKGROUND OF INVENTION

Theaters heretofore devised have required the attention of one or more attendants in the performance of technical operations.

Presentations of educational materials at museums and points of historical interest, such as Williamsburg, are generally limited to displays of collected items of interest or reproductions thereof and sometimes include motion pictures of significant occurrences re-enacted by professional actors. Viewing such exhibits generally leaves the viewer with the impression that he is an outsider learning facts of historical significance about the point in time and about persons with whom he cannot relate.

In short, presentation of historical information has heretofore failed to involve the emotions of the viewer.

SUMMARY OF THE INVENTION

I have devised a method and apparatus for presenting information, particularly information relating to historical occurrences, which appeals to the emotions of the spectator causing him to feel that he is participating in the historical occurrence feeling the joy, anxiety, grief and other emotions of persons actually viewing a historical event.

The apparatus which I employ includes a graphic representation related to the subject, such as the map, aerial photograph, artist's representation, or 3-dimensional model, displayed adjacent a screen upon which pictorial images are projected in combination with sound producing apparatus located at spaced locations in an auditorium.

Automated apparatus is employed for maintaining synchronism between sounds, projected images and actuation of indicators on the graphic representation. The synchronizing or control apparatus generally comprises a clock which energizes the system in combination with a magnetic tape player which simultaneously generates audio signals and time pulses, the time pulses being employed for stepping a punched tape reader. The tape reader delivers signals through a transducer for actuating indicators on the graphic representation, for controlling the projection apparatus and for actuating switching means in an audio circuit causing sound to be delivered from speakers in a pre-programmed sequence.

A primary object of the invention is to provide an improved method and apparatus for presenting facts wherein a graphic representation is employed for correlating pictorial representations projected onto a screen adjacent the graphic representation.

Another object of the invention is to provide improved control apparatus for maintaining projected images, sound and graphic representation in a constantly synchronized relationship.

Other and further objects of the invention will become apparent upon referring to the detailed description hereinafter following and the drawing annexed hereto.

DESCRIPTION OF DRAWING

Drawings of a preferred embodiment of the invention are annexed hereto so that the invention may be better and more fully understood in which:

FIG. I is a diagrammatic representation of the control apparatus illustrating its relationship to projectors, indicators on a graphic representation and sound equipment; and FIG. II is a schematic representation of a magnetic tape having an audio sound track and a timing pulse track disposed in side by side relation.

Numeral references are employed to designate like parts throughout the various figures of the drawing.

DESCRIPTION OF A PREFERRED EMBODIMENT

Referring to FIG. I of the drawing the numeral 1 generally designates a clock adapted to generate signals at periodic intervals of time, for example, every thirty (30) minutes, for energizing the control apparatus.

Clock 1 delivers signals through electrical conductors 2 to start a magnetic tape player 3 which delivers electrical current variations through conductors 4 to a speaker 5.

Speaker 5 is preferably positioned in a theater lobby, museum area, amusement park or other suitable location. Tape player 3 preferably announces that a presentation will begin at a certain time and briefly summarizes the content of the presentation.

At a predetermined time after signals have been delivered through conductors 2 for starting tape player 3, clock 1 delivers signals through conductors 6 for starting a second magnetic tape player 8 having a tape 9, best illustrated in FIG. II, for delivering sound to an auditorium and for generating timing pulses employed for stepping control apparatus which will be hereinafter more fully explained.

The magnetic tape 9 has a first audio sound track 10 comprising a series of variations in magnetization of magnetic particles along the length of the tape.

Tape 9 has a second track comprising spaced magnetized areas 12 for generating timing pulses which are delivered through conductors 14, amplifier 16, conductors 18 to a programmed control apparatus 20. Control apparatus 20 comprises a tape reader 22 of conventional design having stepping apparatus connected to an electrically charged drum 24 upon which a punched paper tape 26 is rotatably disposed. The reader 22 has a transducer 28 associated therewith for delivering electrical signals from terminals therein when an opening 26a on tape 26 is positioned adjacent a sensor on transducer 28.

Timing pulses delivered from tape player are preferably delivered at equally spaced time intervals, for example, at one half second, for advancing tape 26.

Tape reader 22 preferably has a plurality of tracks and in the particular embodiment of the invention which I have constructed and successfully tested, an 82 channel or track tape is employed.

Control apparatus 20 is employed for the controlling of the apparatus fro projecting pictorial representation and in the particular embodiment of the invention illustrated in the drawing, such projection apparatus comprises a plurality of slide projectors 30, 32 and 34 arranged to project images upon a screen 36. Each projector 30, 32 and 34 is of identical construction having a dimmer apparatus 30a arranged to control the intensity of the light source in the projector apparatus and suitable slide change mechanism 30b arranged for moving transparent film slides sequentially into a position to be illuminated by the light source. Conductors 30c and 30d are arranged for transmitting signals from transducer 28 of control apparatus 20 for controlling operation of dimmer 30a and slide change apparatus 30b, respectively.

Projectors 32 and 34 are similarly constructed, projector apparatus 32 being controlled by signals delivered from transducer 28 through conductors 32c and 32d.

While projectors 30, 32 and 34 may be arranged for projecting images onto any predetermined area of screen 36 as desired, projector 30 is positioned to project an image upon area 38 while projectors 32 and 34 are arranged for projecting images upon an area 39 on the screen.

It should be appreciated that projectors 32 and 34, each being focused upon the same area 39 of the screen 36, are arranged to permit extensive use of lighting effects through the employment of dimmers 32a and 32b.

A suitable graphic representation coordinated with the subject matter of the projected pictorial representations is positioned adjacent the surface of screen 36 upon which images are projected. In the particular embodiment of the invention illustrated in the drawing the graphic representation comprises a map 40 which is an artist's representation of the route taken by the motorcade in Dallas, Texas the day President John F. Kennedy was assassinated. A path 42 defining the route of the motorcade as well as significant landmarks 44 are illustrated on the graphic representation 40. Indicator lights 46 and 48 are spaced along path 42 and positioned adjacent landmarks 44.

A plurality of indicator lights 46 are connected forming independent groups 46a, 46b, 46c are arranged to be illuminated independently. In the particular embodiment of the invention illustrated in the drawing three lights are connected through conductors 50 and 52 with conductors 54 and 56 connected through contacts of a stepping relay 58 to opposite terminals of a source of electricity 60.

Stepping relay 58 is of conventional design having a movable pole 58a which is positionable for completing a circuit through one or more of a plurality of contacts 58c. Pole 58a is moved by a stepping mechanism 58d when an electrical signal is delivered through conductors 62 from transducer 28 of control apparatus 20. If it is deemed expedient to do so each indicator 46 may be powered through a diode 47 to assure that the bulbs will be illuminated only when the selected contact of stepping relay 58 is engaged by pole 58a thereof.

It should be appreciated that while graphic representation 40 in the particular embodiment of the invention illustrated in the drawing is an artist's representation of a 3-dimensional map, such representation may assume other forms, for example, an aerial photograph, genealogical chart, chronological listing of events or other forms of presentation of material related to the material presented in the projected images.

The plurality of speakers 70, 72, 74 and 76 are positioned in spaced apart relation about the auditorium.

Magnetic tape player 8 has a reproducing head for converting magnetic variations in sound track 10 on tape 9 into electrical signals which are delivered through conductor 78 to an audio amplifier 80.

Output signals from amplifier 80 are directed through conductors 78 to a current responsive switching means, such as relay 73. When the coil 70c of relay 70b is energized by a signal delivered from transducer 28 of control apparatus 20 through conductor 70d the signal from amplifier 80 is passed through conductor 70e to speaker 70.

Output signals from amplifier 80 are similarly routed through relays 72b, 74b and 76b to speakers 72, 74 and 76, respectively when the coils of the respective relays are energized by signals delivered from transducer 28 of control apparatus 20.

If it is deemed expedient to do so, screen 36 may be elevated by connecting same to a shaft 36a rotatably journaled into suitable support means and powered by a motor 36b energized by signals delivered by transducer 28 of control apparatus 20 through conductor 26c.

OPERATION

The apparatus hereinbefore described comprises automated control apparatus adapted to maintain synchronism between sound produced, pictorial images projected and actuation of indicator means on a graphic representation.

Clock 1 delivers a signal through conductor 2 for energizing tape player 3, causing a prerecorded message to be delivered through speaker 5.

Clock 1 subsequently delivers the signal through conductor 6 energizing tape player 8 for delivering recorded sound through speakers 70, 72, 74 and 76, a particular speaker being operative at a particular time by controlled signals delivered through conductors 70d, 72d, 74d and 76d. The program carried by the punched tape 26 determines which speaker or combination of speakers will deliver sound at any given moment.

Time pulses generated by tape player 8 advance the control apparatus 20, as hereinbefore described, for delivering signals to projectors 30, 32 and 34 and for delivering signals to controls of stepping relay 58 for illuminating one or more groups of indicators 46 on the graphic representation 40.

For instance, in relating the events which occurred the day of the assassination of President Kennedy, a particular portion of the program established on tape 26 might cause projectors 30 and 32 to project pictures of President Kennedy waving to the crowd at a particular point along the path 42, which would be indicated by illumination of group 46b of indicator lights 46 and by illumination of light 48 on a landmark 44 on the map 40. Projector 30 forms a photograph of President Kennedy waving to the crowd on area 38 of screen 36 and projectors 32 and 34 sequentially project the pictures of the enthusiastic crowd cheering and waving at the President.

Spectators are seated or standing viewing the exhibit.

At the instant in the program immediately following the firing of the assassin's bullet projector 30 displays a picture of the falling president, projectors 32 and 34 display rapidly changing slides showing faces in the astonished crowd of onlookers while sound coordinated with the slides is delivered through first one speaker and then another such that the sound appears to be coming from the crowd of spectators in the audience.

It should be appreciated that colored spot lights, strob lights, and theater lighting can be controlled by the apparatus hereinbefore described to change the mood of spectators before or after a particular pictorial image has been projected. If it is deemed expedient to do so, sound generating apparatus in addition to recorded sound equipment can be controlled.

A preferred embodiment of the invention has been described. However, it should be readily apparent that other and further embodiments may be devised without departing from the spirit and scope of my invention.

Having described my invention I claim:

1. Apparatus to display pictorial and graphic representations in synchronized relation comprising, projection means to project pictorial images onto a screen surface; a graphic map representation positioned adjacent said screen surface; indicator means on the graphic map representation, said indicator means indicating a specific location on said graphic map representation specifically related to a projected image; and control means operably connected to the projection means and to the indicator means, said control means being adapted to maintain synchronism between the projection means and the indicator means such that a predetermined location on the graphic map representation is designated simultaneously with the projection of a related image.

2. The combination called for in claim 1 with the addition of sound producing means; and synchronizing means associated with the sound producing means to maintain synchronism between the control means and sound produced.

3. The combination called for in claim 1 wherein the projection means comprises a slide projector adapted to sequentially project images.

4. The combination called for in claim 1 wherein the indicator means comprises a plurality of lights disposed in spaced apart relation along a path on said map.

5. The combination called for in claim 4 wherein the switching means comprises a stepping relay, and wherein the control means comprises a tape reader adapted to cause the stepping relay to sequentially energize said lights.

6. The combination called for in claim 1 with the addition of a sound recording transducer; a plurality of speakers disposed in spaced apart relation; signal responsive switching means connected between the transducer and each of said speakers, said control means being adapted to deliver signals to said switching means to actuate said speakers.

7. The combination called for in claim 1 wherein the control means comprises a tape reader; and wherein the graphic representation comprises a map positioned adjacent images displayed by said projection means; and wherein the indicator means comprises indicator lights on said map, each of said lights being controlled by the tape reader.

8. An automated theater comprising, a clock, said clock being adapted to periodically generate a start signal; player means adapted to be energized by said start signal; a recording having a sound track and a pulse track, said recording being adapted to cause said player to generate audio signals from a first terminal and timing pulses from a second terminal; a plurality of sound speakers spaced about the theater; current responsive switching means between said first terminal and each of said speakers adapted to direct audio signals selectively to the respective speakers; programmed means connected to said second terminal and controlled by said timing pulses; means to connect said programmed means to said switching means; a screen; projection means adapted to display images on said screen, said projection means being controlled by said programmed means; a graphic representation adjacent said screen; indicator lights on said graphic representation; and means to connect said programmed means to each of said indicator lights such that the lights designate a predetermined location on said graphic representation related to the image projected on the screen adjacent to the graphic representation.

9. The combination called for in claim 8 wherein the programmed means comprises a tape reader having a tape carrier stepped by timing pulses; a programmed tape advanced by said carrier and adapted to cause said reader to deliver signals from predetermined terminals in a predetermined sequence.

* * * * *